United States Patent [19]

Bononi

[11] Patent Number: 4,563,066

[45] Date of Patent: Jan. 7, 1986

[54] END PIECE OF A SPECTACLE FRAME EARPIECE

[76] Inventor: Walter Bononi, Zeppelinstrase 9, 7012 Fellbach-Schmiden, Fed. Rep. of Germany

[21] Appl. No.: 539,718

[22] Filed: Oct. 6, 1983

[30] Foreign Application Priority Data

Oct. 9, 1982 [DE] Fed. Rep. of Germany ....... 3237501

[51] Int. Cl.⁴ ............................................. G02C 5/14
[52] U.S. Cl. ...................................... 351/122; 351/123
[58] Field of Search ................................ 351/122, 123

[56] References Cited

U.S. PATENT DOCUMENTS 2,294,840 9/1942 Dunn ................................... 351/122
3,684,356 8/1972 Bates ............................... 351/122 X Primary Examiner—Rodney B. Bovernick

[57] ABSTRACT

A spectacle frame earpiece has a flexible portion in the form of a rod, for adaption to the wearer's head, and a skin-soft sleeve composed of elastic material enclosing the flexible portion and extending to the end of the earpiece. A core in the form of a small plate is cast within the sleeve. The core is composed of substantially harder material than the sleeve. The core has a blind hole with a flattened cross-section for receiving and force-locking with a flattened cross-section at the end of the flexible portion of the rod.

15 Claims, 5 Drawing Figures

END PIECE OF A SPECTACLE FRAME EARPIECE

The invention relates to an end piece of a spectacle frame earpiece having a metallic tang, a sheath of synthetic plastic material seated on said tang, said material being composed of silicone rubber having a Shore-D hardness of between 10–30 according to the DIN 53505 standard.

DIN 53505 is entitled "Testing of Elastomers; Shore A and D Hardness Testing." It describes a method of determining the hardness of elastomers. In relevant part, DIN 53505 states:

The Shore hardness means the resistance to penetration by a body of defined shape under a defined compressive load.

The hardness scale covers the range from 0 to 100, 0 representing the least and 100 the greatest hardness.

The method and apparatus for performing Shore hardness testing and measurement also are described in American Society of Testing Materials (ASTM) Standard D 2240-85, entitled "Standard Test Method for Rubber Property—Durometer Hardness".

BACKGROUND OF THE INVENTION

Such an earpiece end piece has become known from Fed. Ger. Pub. Sp. No. 25 48 552. The material used there has—especially in its lower hardness range—a softness comparable with the skin. This is good for the skin. On the other hand, however, a pair of spectacles—especially if it has correcting lenses—is an optical instrument which must be held very precisely at that position to which it was fitted by the optician. This signifies that the tang in this kind of spectacle earpiece must be metallic.

Now the problem consists in securing something very soft, of high quality, to something very hard, without the very soft part or the very hard part sacrificing its properties.

OBJECT AND STATEMENT OF THE INVENTION

It is the object of the invention to render possible a practical, durable, high quality fastening which does not restrict the designer aesthetically and requires low expense both in fitting and in production, between the tang on the one hand and the sheath on the other.

In accordance with the invention, this objective is achieved by the following features:

The end of said tang has a flattened cross-section in the lateral direction with barbs directed away from said tang over a length of between 0.5–1 cm.

A very small synthetic plastic sleeve of flattened cross-section composed of substantially harder material is seated on said barbed region, said plastic sleeve has a blind hole with a flattened cross-section that accommodates said barbed region with contracting stress, the points of said barbs biting into said plastic sleeve at its inner surface.

A small plate extends integrally on said plastic sleeve, said plate has a flattened cross-section approximately as long as said plastic sleeve and has at least one transverse orifice therein.

Said sheath surrounds said plastic sleeve and said plate, forming one coherent part which is pushed to a seating position on said tang.

Said tang is connected with said sheath inwards from said plastic sleeve, (viewed from the end of said tang) by an adhesive connection comprised of a primer on said tang and an adhesive on said primer.

Advantageously, the invention includes the following additional features:

In said barbed region, said tang is wider in the lateral direction than before said region.

The sheath does not bulge out laterally quite at the end of the tang, but rather can have a continuously equal width even there, without loss of wall width.

Said barbs are provided on the transverse outline of said flattened cross-section at the end of said tang. The barbs become relatively narrow and the specific force per unit area with which they can bite into the synthetic plastics sleeve becomes greater. Moreover then the synthetic plastics sleeve is also initially stressed in its longer transverse direction.

Said barbs are provided both on the upper peripheral surface and on the lower peripheral surface of said flattened cross-section. The barb force is distributed over larger sections and it is not necessary to make the individual barbs so large, so that they are not conspicuous from the exterior even if the material for the synthetic plastics sleeve and the sheath is crystal-clear.

Said flattened cross-section at the end of said tang has at its free end a barb-free rounded portion for introduction into said sleeve. The synthetic plastics sleeve can be pushed on to the tang more easily.

The extent of said flattened cross-section of said small plte is greater than the extent of said flattened cross-section of said plastic sleeve. An additional shape-locking results along the outer edge of the small plate in relation to the sheath.

Said small plate has two longitudinal orifices. The objects are achieved both of a better anchorage of the silicone rubber to the small plate and that the small plate is practically invisible.

DESCRIPTION OF THE DRAWINGS

The invention will now be described by reference to a preferred example of embodiment. In the drawing.

DETAILED DESCRIPTION

Figure 1:
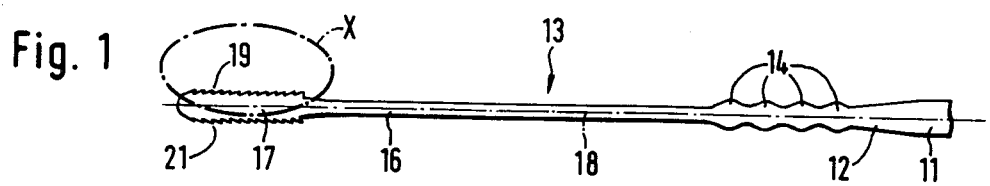
FIG. 1 shows the lateral view of the tang with spectacle frame broken away.
Figure 2:
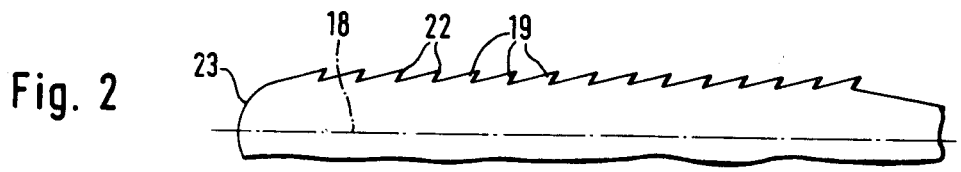
FIG. 2 shows the left upper region of the tang on tenfold scale.
Figure 4:
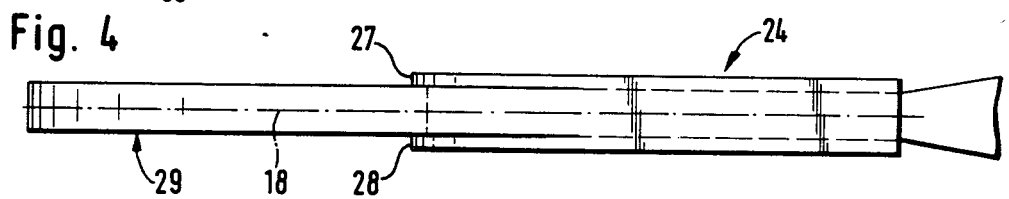
FIG. 4 shows a view in the direction of the arrow A in FIG. 3.

According to FIG. 1, a spectacle frame earpiece runs with a taper 12 cut into a tang 13. Both the spectacle earpiece 11 and the tang 13 have an I-section. As used herein, the term "I-section" means an elongated portion with a flattened cross-section. The taper 12 is followed by widening 14 directed by pairs to both sides and provided with like flanks in both directions. From there onwards the tang 13 has a constant I-section. This I-section 16 of equal cross-section is followed by a widening 17 of beaver tail form, which likewise is of I-section but in the plan view in FIG. 4 is not so wide as the I-section 16, but is higher in the view in FIG. 1. Parallel with the geometrical longitudinal axis 18 of the unbent tang 13 a largish number of fine barbs 19, 21 extends on the upper and under sides of the widening 17, the points of which barbs are equidistant from the geometrical longitudinal axis 18. As may be seen from FIG. 2, the barbs point to the right. The distance from barb to barb is 0.6 mm. The inclination of the undercut flank of each barb is 30° to the vertical and the inclination of the non-undercut flank is 15° to the horizontal. The barbs 19, 21 are 0.2 mm. high. At its left end the widening 17 is free from barbs, and there it terminates with a rounded portion 23.

A synthetic plastics part 24 is injection-moulded in one piece from crystal-clear acetate. It has on the right a sleeve 25 of I-section, in which a blind hole 26 is provided. This blind hole is somewhat smaller in height than corresponds to the distance between the points 22 of the barbs 19 on the one hand and of the barbs 21 on the other. In length, the blind hole 26 can accommodate the widening 17.

Figure 3:
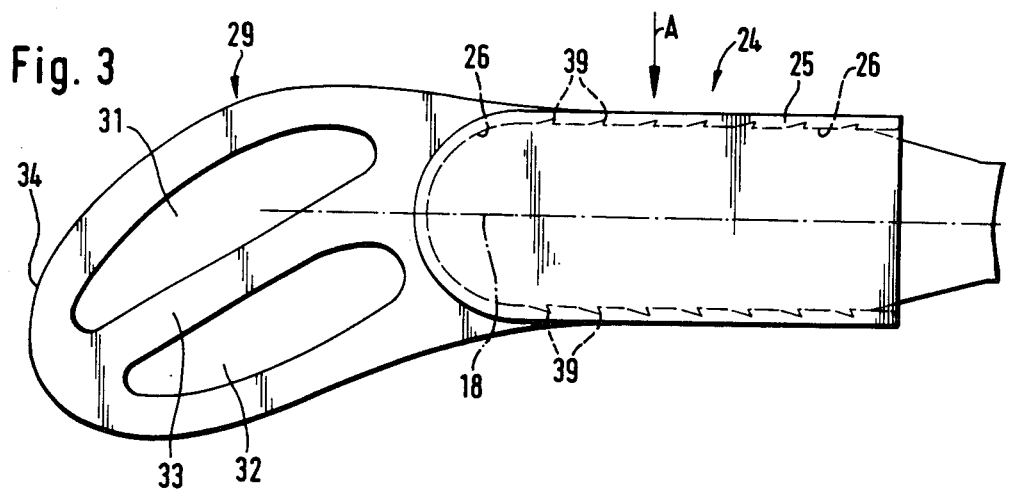
FIG. 3 shows the lateral view of a synthetic plastics small part with tang end indicated in chain lines.

As FIG. 4 shows, on account of its wall thickness the sleeve 25 is wider than the widening 17. With two distinct steps 27, 28 the sleeve 25 passes over into a small plate 29 of 0.8 mm. thickness arranged symmetrically according to FIG. 4, which according to FIG. 3 widens considerably downwards and to the left, but in the view according to FIG. 4 is substantially thinner than the sleeve 25. In the comparatively large area of the plate 29 there are provided two orifices 31, 32 which are separated by a web 33. The marginal regions remaining outside the orifices 31, 32 are approximately exactly as wide as the web 33. As shown by a glance at FIG. 5 the plate 29 with reduced marginal distance assumes approximately that droplet shape which is always provided at the end of such synthetic plastics sheaths. The outline 34 of the plate 29 is nowhere less than 2 mm. from the outline of the droplet form 36 (FIG. 5), so that there is no visible impression of the plate 29 from the exterior.

The synthetic plastics part 24 is surrounded by casting by the droplet form 36 of a sheath 37 of silicone rubber. The sheath 37 has an internal recess 38 corresponding to the outline of the I-section 16. In the unassembled condition the sheath 37 is straight. The internal recess 38 merges into the blind hole 26.

Figure 5:
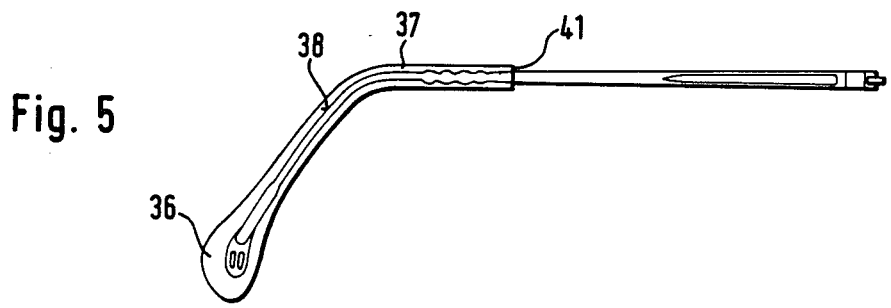
FIG. 5 shows the lateral view of a spectacle frame earpiece in the finished bent-over condition.

In assembly, contrary to FIG. 5, the tang is straight, just as shown by way of example by FIG. 1, and the sheath 37 is equally straight. Then the sheath 37 is pushed on to the tang 13 until the widening 17 is seated completely in the blind hole 26 and the points 22 have bitten into the narrow side wall of the blind hole 26, as shown at 39 in FIG. 3.

Before the tang is pushed in, a primer of Type G 790 of the firm Wacker-Chemie is applied to the tang 13, and after the primer is dried adhesive E 43 likewise of the firm Wacker-Chemie is applied. With the hook engagement by the barbs 19, 21 then the adhesiion process begins at room temperature.

At least initially, the widenings 14 also help to keep the right end of the sheath 37 in position. The right end face 41 of the sheath in FIG. 5 can be covered by a small cover section.

I claim:

1. End piece of a spectacle frame earpiece having a metallic tang, a sheath of synthetic plastic material seated on said tang, said material being composed of silicone rubber having a Shore-D hardness of between 10–30 according to the DIN 53,505 standard, and the improvement wherein:

the end of said tang has a flattened cross-section in the lateral direction with barbs directed away from said tang over a length of between 0.5–1. cm., a very small synthetic plastic sleeve of flattened cross-section composed of substantially harder material is seated on said barbed region, said plastic sleeve has a blind hole with a flattened cross-section that accommodates said barbed region with contracting stress, the points of said barbs biting into said plastic sleeve at its inner surface, a small plate extends integrally on said plastic sleeve, said plate has a flattened cross-section approximately as long as said plastic sleeve and has at least one transverse orifice therein, said sheath surrounds said plastic sleeve and said plate, forming one coherent part which is pushed to a seating position on said tang, said tang is connected with said sheath inwards from said plastic sleeve, (viewed from the end of said tang) by an adhesive connection comprised of a primer on said tang and an adhesive on said primer.

2. End piece of a spectacle frame earpiece according to claim 1, wherein in said barbed region, said tang is wider in the lateral direction than before said region.

3. End piece of a spectacle frame earpiece according to claim 1, wherein said barbs are provided on the transverse outline of said flattened cross-section at the end of said tang.

4. End piece of a spectacle frame earpiece according to claim 3, wherein said barbs are provided both on the upper peripheral surface and on the lower peripheral surface of said flattened cross-section.

5. End piece of a spectacle frame earpiece according to claim 1, wherein said flattened cross-section at the end of said tang has at its free end a barb-free rounded portion for introduction into said sleeve.

6. End piece of a spectacle frame earpiece according to claim 1, wherein the extent of said flattened cross-section of said small plate is greater than the extent of said flattened cross-section of said plastic sleeve.

7. End piece of a spectacle frame earpiece according to claim 1, wherein said small plate has two longitudinal orifices.

8. In a spectacle frame earpiece, aving a flexible portion in the form of a rod, for adaption to the wearer's head, and a sleeve enclosing said flexible portion and extending to the end of said earpiece, said sleeve being composed of elastic material having a Shore-D hardness of between 10–30 according to the DIN 53.505 standard, said sleeve having a longitudinal recess for receiving said flexible portion, the improvement comprising:

a core in the form of a small plate cast within said sleeve, said core being composed of substantially harder material than said sleeve, said core having a blind hole with a flattened cross-section for receiving and force-locking with the end of said flexible portion, at least the end of said flexible portion receivable in said blind hole of said core having a flattened cross-section.

9. Spectacle frame earpiece according to claim 8 comprising a transition zone on said earpiece next to said flexible portion, the end of said elastic sleeve remote from said earpiece end being force fit into said transition zone, and means in said transition zone stick said sleeve and said earpiece to one another.

10. Spectacle frame earpiece according to either one of claim 8 or 9, wherein said blind hole of said core and said end of said flexible portion have rectangular cross-section, the cross-sectional area of said flexible portion being somewhat larger than that of said blind hole.

11. Spectacle frame earpiece according to either one of claims 8 or 9, wherein said end of said flexible portion pushable into said blind hole of said core has a roughened surface.

12. Spectacle frame earpiece according to either one of claims 8 or 9, wherein said end of said flexible portion pushable into said blind hole of said core has an undulatory structure on two sides of its cross-section opposite to each other.

13. Spectacle frame earpiece according to claim 12, wherein said undulatory structure is in the form of barbs.

14. Spectacle frame earpiece according to claim 8, wherein said core plate has holes in the region outside said blind hole.

15. Spectacle frame earpiece according to claim 8, wherein said elastic sleeve is composed of batch-dyed material.

* * * * *